(12) United States Patent
Nelson

(10) Patent No.: US 9,009,662 B2
(45) Date of Patent: *Apr. 14, 2015

(54) PLATFORM SENSITIVE APPLICATION CHARACTERISTICS

(75) Inventor: Dave Nelson, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1263 days.

This patent is subject to a terminal disclaimer.

(21) Appl. No.: 12/338,657

(22) Filed: Dec. 18, 2008

(65) Prior Publication Data

US 2013/0219376 A1 Aug. 22, 2013

(51) Int. Cl.
G06F 9/44 (2006.01)
G06F 9/445 (2006.01)

(52) U.S. Cl.
CPC ................ *G06F 9/44505* (2013.01)

(58) Field of Classification Search
None
See application file for complete search history.

(56) References Cited

U.S. PATENT DOCUMENTS

| | | | |
|---|---|---|---|
| 5,295,241 A | | 3/1994 | Eagen et al. |
| 5,485,560 A * | | 1/1996 | Ishida et al. ................ 345/619 |
| 5,596,702 A * | | 1/1997 | Stucka et al. ................ 715/746 |
| 5,603,034 A * | | 2/1997 | Swanson ...................... 717/111 |
| 5,706,502 A * | | 1/1998 | Foley et al. ................... 717/120 |
| 5,790,857 A * | | 8/1998 | Clifford et al. ............... 717/106 |
| 5,842,020 A * | | 11/1998 | Faustini ....................... 717/111 |
| 5,867,153 A * | | 2/1999 | Grandcolas et al. ............ 705/39 |
| 5,991,534 A * | | 11/1999 | Hamilton et al. ............. 717/111 |
| 6,023,714 A * | | 2/2000 | Hill et al. ..................... 715/235 |
| 6,075,935 A * | | 6/2000 | Ussery et al. ................. 717/106 |
| 6,205,407 B1 * | | 3/2001 | Testa et al. ................... 717/106 |
| 6,205,576 B1 * | | 3/2001 | Rajala et al. ................. 717/120 |
| 6,226,792 B1 * | | 5/2001 | Goiffon et al. ............... 717/120 |
| 6,260,050 B1 * | | 7/2001 | Yost et al. .................... 715/202 |
| 6,292,186 B1 | | 9/2001 | Lehman et al. |
| 6,342,907 B1 * | | 1/2002 | Petty et al. ................... 715/762 |
| 6,374,305 B1 * | | 4/2002 | Gupta et al. ................. 709/246 |
| 6,407,761 B1 * | | 6/2002 | Ching et al. ................. 715/835 |

(Continued)

OTHER PUBLICATIONS

Ahmed Seffah et al., "Multiple User Interfaces Cross-Platform Applications and Context-Aware Interfaces", Wiley, 2004, <http://www.wiley.com/WileyCDA/WileyTitle/productCd-0470854448.html> pp. 1-415.*

(Continued)

*Primary Examiner* — Thuy Dao
*Assistant Examiner* — Samuel Hayim
(74) *Attorney, Agent, or Firm* — Kilpatrick Townsend & Stockton LLP

(57) ABSTRACT

Systems and methods which provide platform sensitive application characteristics with respect to multi-platform applications are shown. As application aspects are developed in the application, embodiments include platform sensitivity characteristics for the application aspects in the application to provide for adaptation of application characteristics for multiple platforms. Embodiments provide an application runtime environment which, although independently defining its own user interface rendering attributes, operates to adjust application characteristics in accordance with a host platform. As application aspects of a multi-platform application are to be executed, if there are relevant cross platform differences, application aspect characteristics are adjusted so as to be appropriate to the host platform. The appropriately adjusted aspects are executed to thereby provide platform sensitive application characteristics with respect to the multi-platform application.

31 Claims, 4 Drawing Sheets

(56) References Cited

U.S. PATENT DOCUMENTS

| | | | |
|---|---|---|---|
| 6,473,100 B1 | 10/2002 | Beaumont et al. | |
| 6,476,828 B1* | 11/2002 | Burkett et al. | 715/760 |
| 6,591,289 B1 | 7/2003 | Britton | |
| 6,633,315 B1* | 10/2003 | Sobeski et al. | 715/762 |
| 6,961,750 B1 | 11/2005 | Burd et al. | |
| 6,973,619 B1* | 12/2005 | Hirose et al. | 715/234 |
| 7,146,387 B1* | 12/2006 | Russo et al. | 1/1 |
| 7,146,563 B2* | 12/2006 | Hesmer et al. | 715/223 |
| 7,320,109 B1* | 1/2008 | Zeevi et al. | 715/763 |
| 7,366,972 B2 | 4/2008 | Baumert et al. | 715/200 |
| 7,412,658 B2* | 8/2008 | Gilboa | 715/762 |
| 7,500,188 B1* | 3/2009 | Trapani et al. | 715/273 |
| 7,565,605 B2* | 7/2009 | Schohn et al. | 715/249 |
| 7,574,712 B2* | 8/2009 | Allamaraju et al. | 719/318 |
| 7,636,895 B2* | 12/2009 | Gilboa | 715/763 |
| 7,747,782 B2* | 6/2010 | Hunt et al. | 709/246 |
| 7,784,073 B2* | 8/2010 | Chung et al. | 725/37 |
| 7,917,859 B1* | 3/2011 | Singh et al. | 715/763 |
| 8,001,478 B2* | 8/2011 | Bhatia et al. | 715/745 |
| 8,028,237 B2* | 9/2011 | Schmitt | 715/744 |
| 8,166,390 B2* | 4/2012 | Fortes et al. | 715/238 |
| 8,196,044 B2* | 6/2012 | Barrett | 715/718 |
| 8,279,848 B1* | 10/2012 | Gailloux et al. | 370/349 |
| 8,365,144 B1 | 1/2013 | Webb | 717/109 |
| 2001/0017632 A1 | 8/2001 | Goren-Bar | |
| 2001/0054087 A1* | 12/2001 | Flom et al. | 709/218 |
| 2002/0035595 A1* | 3/2002 | Yen et al. | 709/203 |
| 2002/0099456 A1 | 7/2002 | McLean | |
| 2002/0105548 A1* | 8/2002 | Hayton et al. | 345/764 |
| 2002/0145627 A1* | 10/2002 | Whitmarsh et al. | 345/745 |
| 2002/0161803 A1 | 10/2002 | Shelton | |
| 2002/0165881 A1 | 11/2002 | Shelton | |
| 2002/0169805 A1 | 11/2002 | Edge | |
| 2003/0043192 A1* | 3/2003 | Bouleau | 345/762 |
| 2003/0046401 A1 | 3/2003 | Abbott et al. | |
| 2003/0090514 A1 | 5/2003 | Cole et al. | |
| 2003/0137539 A1 | 7/2003 | Dees | |
| 2003/0160822 A1* | 8/2003 | Belz et al. | 345/762 |
| 2003/0202014 A1* | 10/2003 | Wood | 345/763 |
| 2004/0148586 A1* | 7/2004 | Gilboa | 717/108 |
| 2005/0005259 A1* | 1/2005 | Avery et al. | 717/103 |
| 2005/0054381 A1 | 3/2005 | Lee et al. | |
| 2005/0091400 A1* | 4/2005 | Hartley | 709/238 |
| 2005/0251788 A1 | 11/2005 | Henke et al. | |
| 2006/0047665 A1* | 3/2006 | Neil | 707/10 |
| 2006/0123345 A1* | 6/2006 | Parimi | 715/746 |
| 2006/0123347 A1* | 6/2006 | Hewitt et al. | 715/748 |
| 2006/0267857 A1* | 11/2006 | Zhang et al. | 345/1.1 |
| 2006/0284861 A1 | 12/2006 | Choi | |
| 2007/0113193 A1* | 5/2007 | Popp et al. | 715/760 |
| 2007/0220480 A1* | 9/2007 | Waldman et al. | 717/106 |
| 2008/0079750 A1 | 4/2008 | Setlur | |
| 2008/0270597 A1* | 10/2008 | Tenenti | 709/224 |
| 2009/0006992 A1* | 1/2009 | Gilboa | 715/763 |
| 2009/0144652 A1* | 6/2009 | Wiley | 715/800 |
| 2010/0050152 A1* | 2/2010 | Gilboa | 717/106 |
| 2010/0228880 A1* | 9/2010 | Hunt et al. | 709/246 |

OTHER PUBLICATIONS

Marcus Bloice et al., "Java's Alternatives and the Limitations of Java when Writing Cross-Platform Applications for Mobile Devices in the Medical Domain", IEEE, 2009, <http://ieeexplore.ieee.org/stamp/stamp.jsp?tp=&arnumber=5196053>, pp. 1-8.*

Leo Yang et al., "Cross-Platform Performance Prediction of Parallel Applications Using Partial Execution", IEEE, 2005, <http://delivery.acm.org/10.1145/1110000/1105805/27580040.pdf>, pp. 1-11.*

U.S. Appl. No. 12/338,620, filed Dec. 18, 2008.

Office Action in Related U.S. Appl. No. 12/338,620, dated Jul. 18, 2012, 29 pages.

Office Action in Related U.S. Appl. No. 12/338,620, dated Jan. 16, 2014, 33 pages.

* cited by examiner

PLATFORM SENSITIVE APPLICATION CHARACTERISTICS

REFERENCE TO RELATED APPLICATIONS

The present disclosure is related to co-pending and commonly assigned U.S. patent application Ser. No. 12/338,620, entitled "Platform Sensitive Application Characteristics," filed concurrently herewith, the disclosure of which is hereby incorporated herein by reference

TECHNICAL FIELD

The present disclosure relates generally to multi-platform applications and, more particularly, to providing platform sensitive application characteristics with respect to such multi-platform applications.

BACKGROUND

The availability and use of computers has become nearly ubiquitous in modern society. Computers, such as personal computers (PCs), are in wide use today in homes and businesses for tasks such as word processing, accounting, graphics, imaging, social networking, data management, gaming, application development, etc. Although significant strides have been made with respect to providing compatibility, particularly data compatibility, between computers of different makes, models, and operating systems, such computers are not homogeneous. That is, the underlying computing architecture, the operating system protocols, the computer resources, etc. differ from computer to computer, thereby presenting multiple computing platforms having appreciable differences.

Despite the differences in computing platforms, application environments have been developed which facilitate applications (i.e., computer software instructions or code defining desired operation of a host computer) running on multiple platforms. For example, FLASH® available from Adobe Systems Incorporated provides a rich platform independent browser based runtime environment in which applications developed for FLASH® can run on any computer having the FLASH® runtime environment operable thereon. JAVA VIRTUAL MACHINE (JVM) available from Sun Microsystems provides a browser based application environment in which applications developed for JVM can run on any JVM configured computer regardless of the particular host platform configuration. Additionally, ADOBE® INTEGRATED RUNTIME (AIR™) available from Adobe Systems Incorporated provides a versatile application runtime environment in which applications developed using FLASH® PROFESSIONAL (available from Adobe Systems Incorporated), DREAMWEAVER® (available from Adobe Systems Incorporated), FLEX® (available from Adobe Systems Incorporated), JAVASCRIPT (available from Sun Microsystems), asynchronous JAVASCRIPT and XML (AJAX), any text editor (e.g., providing HTML code), etc. can run on any AIR™ configured computer regardless of the particular host platform configuration.

The foregoing multi-platform applications are advantageous because they allow a single application to be developed which supports multiple computing platforms, thereby reducing development costs and increasing availability. However, although providing proper functionality when executed by different computing platforms, such multi-platform applications often do not present various characteristics which appear native to the underlying platform. Alternatively, where such multi-platform applications rely upon the rendering capabilities of the host platform, although perhaps presenting characteristics which appear native to the underlying platform, the developer of such multi-platform applications does not have the ability to customize or otherwise change those characteristics of the application.

BRIEF SUMMARY

The present disclosure is directed to systems and methods which provide platform sensitive application characteristics with respect to multi-platform applications. Embodiments provide an application runtime environment which, although independently defining its own user interface rendering attributes, operates to adjust application characteristics in accordance with a host platform. Accordingly, multi-platform applications provided by embodiments incorporate attributes of the characteristics of a particular host platform upon which the application is presently running. A user may thus be presented with an application having familiar characteristics and/or characteristics which are optimized with respect to a present platform. Moreover, although various characteristics of an application may be made to incorporate attributes of the characteristics of a host platform, a developer remains free to fully customize the application because the application runtime environment defines its own rendering attributes rather than relying upon the rendering capabilities of the particular platform then hosting the application according to embodiments. That is, various attributes of features or functions of an application may remain platform agnostic while platform sensitive characteristics are implemented with respect to these same features and functions.

Embodiments provide a development environment in which multi-platform applications are developed. As features and functions (collectively referred to herein as aspects) are developed in the application, a determination is preferably made as to whether there are any relevant cross platform differences with respect to such aspects. Relevant cross platform differences according to embodiments comprise cross platform differences for which it is desired to provide adaptation of application characteristics. If there are relevant cross platform differences, platform sensitivity characteristics are included in the application to provide for adaptation of application characteristics for multiple platforms. Such platform sensitivity characteristics options may be included automatically, such as through reference to a library of characteristics appropriate to particular platforms for various application aspects, through the use of algorithms to adjust characteristics for particular platforms, etc. Additionally or alternatively, various platform sensitivity characteristics may be defined manually, such as by a developer, if desired.

Runtime environments are provided according to embodiments in which multi-platform applications are executable on multiple platforms, wherein such platforms may comprise, for example, different operating systems, different processor families or architectures, different topologies, etc. For example, runtime environments may be provided for use with selected operating systems (e.g., WINDOWS, MAC OS, LINUX, SOLARIS, UNIX, etc.), selected processor families (e.g., PENTIUM, POWERPC, ITANIUM, etc.), selected topologies (e.g., workstation, client/server, handheld, etc.), and/or the like. As application aspects of a multi-platform application are to be executed, the runtime environment preferably determines whether the aspect has a relevant cross platform difference associated therewith. If there are relevant cross platform differences, aspect characteristics are adjusted so as to be appropriate to the host platform. The appropriately adjusted aspects are executed to thereby provide platform sensitive application characteristics with respect to the multi-platform application.

Embodiments may operate to detect a particular host platform prior to the multi-platform application initiating execution, at a point near the multi-platform application initiating execution, etc. so as to provide information regarding the host platform and/or for use in adjusting application characteristics in accordance with the host platform. Additionally or alternatively, embodiments may operate to detect host platform characteristics at or near execution of a relevant application aspect for use in adjusting application characteristics in accordance with the host platform.

The foregoing application aspects may comprise various application features and functions. For example, embodiments provide platform specific adjustment with respect to attributes of the user interface to present a user interface which is consistent, at least in some desired respects, with user interfaces native to each host platform upon which the multi-platform application may be executed. Such user interface attributes may comprise, for example, the placement of controls (e.g., minimize, maximize, and close controls placed on the right hand side of a window for a first operating system, such as WINDOWS, and on the left hand side of a window for a second operating system, such as MAC OS, so as to be consistent with the programming conventions of those operating systems). As another example, such user interface attributes may comprise video gamma, color temperature, or other underlying user interface attributes.

The foregoing has outlined rather broadly the features and technical advantages of embodiments in order that the detailed description that follows may be better understood. Additional features and advantages of embodiments will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the concepts herein as set forth in the appended claims. The novel features which are believed to be characteristic of the concepts herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWING

For a more complete understanding of the present disclosure, reference is now made to the following descriptions taken in conjunction with the accompanying drawing, in which.

DETAILED DESCRIPTION

Figure 1:
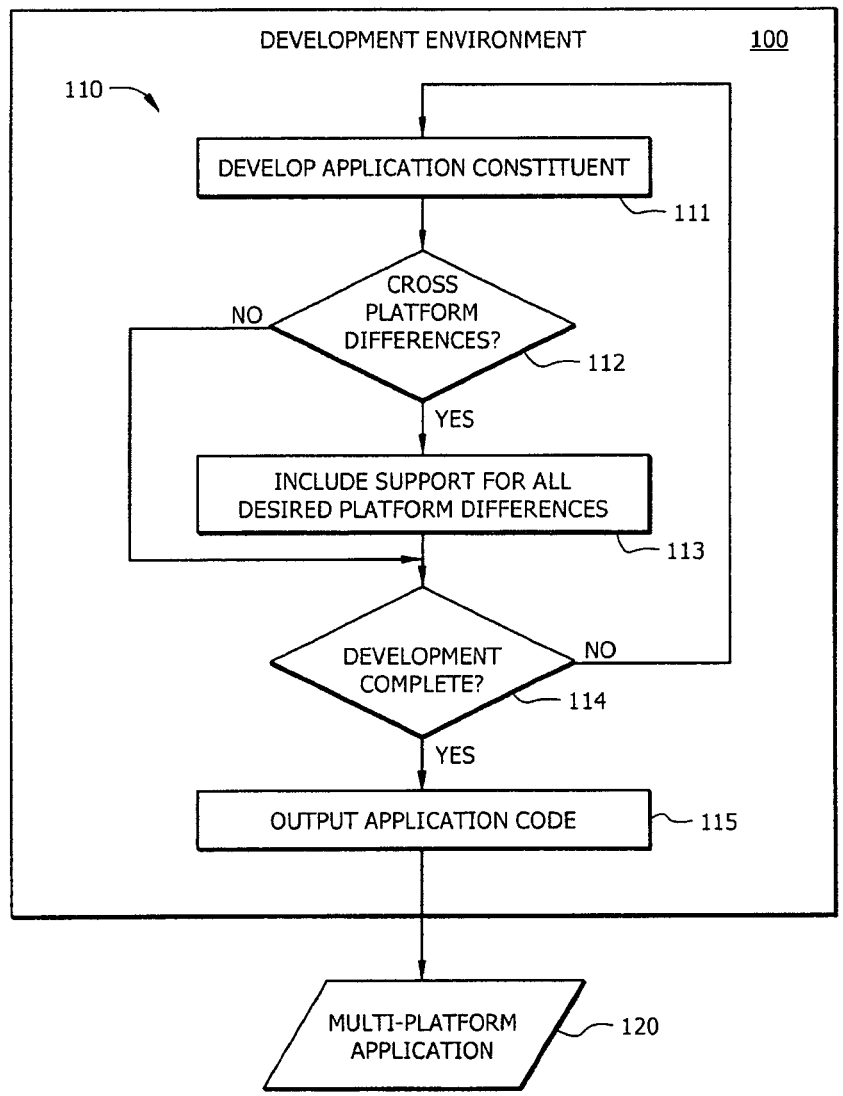
FIG. 1 shows a flow diagram of multi-platform application development operation according to an embodiment.

Directing attention to FIG. 1, a high level flow diagram of operation according to an embodiment to develop multi-platform applications having one or more aspect which is sensitive to the particular host platform the application is executed upon is shown as process 110. The various processes of process 110 may be performed using an application development environment, shown here as development environment 100, adapted to provide functionality as described herein. For example, the FLASH® PROFESSIONAL development environment available from Adobe Systems Incorporated may be adapted to implement the concepts herein.

It is presumed in process 110 that a multi-platform application comprising one or more aspects (i.e., various features, functions, etc.) is being developed in development environment 100. At block 111 of the illustrated embodiment, development environment 100 is operated to develop an application aspect. For example, development environment 100 may accept input of code, may interact with graphical objects, etc. in developing a desired application aspect. To aid in understanding the concepts of the present disclosure, particular exemplary application aspects, such as establishing window controls (e.g., minimize, maximize, and close controls) and display color attributes, shall be referenced below. It should be appreciated, however, that the concepts of the present disclosure are not limited to application to the particular exemplary application aspects discussed herein.

At block 112 of the illustrated embodiment, a determination is made as to whether the application aspect has any relevant cross platform differences associated therewith. In the context of the discussion herein, relevant cross platform differences comprise differences, regarding one or more attribute of an application aspect with respect to different platforms which may host the application, for which it is desired to provide platform sensitivity for, such as to present familiar characteristics and/or characteristics which are optimized for the platforms. Accordingly, various cross platform differences may be implemented which are not provided platform sensitivity according to embodiments, if desired.

A determination that relevant cross platform differences are associated with an application aspect may be made by operation of development environment 100. For example, development environment 100 may utilize algorithms and/or databases to determine if the application aspect has cross platform differences associated therewith which are to be adapted as platform sensitive. Accordingly, an application aspect may be analyzed to be identified as a particular application feature, function, etc. and compared to a database of features, functions, etc. for which platform sensitivity is to be provided.

Additionally or alternatively, a determination that relevant cross platform differences are associated with an application aspect may be made using information accepted by development environment 100 from a developer or other user. For example, development environment 100 may obtain an indication from the developer that the application aspect has relevant cross platform differences associated therewith, such as when developing the application aspect at block 111 or when queried at block 112.

Embodiments may implement a combination of development environment 100 operating to determine if an application aspect has relevant cross platform differences associated therewith and using information indicating that an application aspect has relevant cross platform differences associated therewith from a developer or other user. For example, development environment 100 may initially analyze the application aspect to make a preliminary determination that the application aspect has relevant cross platform differences associated therewith. Thereafter, development environment 100 may query the developer as to whether the preliminary determination is correct and/or to facilitate a developer overriding the determination. The information presented to the developer in such an embodiment may also present information with respect to the particular cross platform differences, such as to allow a developer to make informed choices as to whether to provide platform sensitivity with respect to the application aspect.

If it is determined that the application aspect has relevant cross platform differences associated therewith, processing according to the illustrated embodiment proceeds to block 113 wherein support for desired platform differences is included with respect to the application code being developed. That is, platform sensitivity characteristics for a plurality of platforms are provided. For example, the application aspect may be adapted to include code unique for each platform having relevant cross platform differences with respect to the application aspect for execution when hosted by a respective host platform to thereby render one or more attribute of the application aspect platform sensitive. Additionally or alternatively, the application aspect may be adapted to include variables and associated platform specific values may be utilized when hosted by a respective host platform to thereby render one or more attribute of the application aspect platform sensitive. Embodiments may include information, such as data flags, in the multi-platform application for later use in determining if application aspects have cross platform differences, and thus platform sensitivity characteristics, associated therewith.

Adaptation of the application to utilize platform sensitivity characteristics may be performed by operation of development environment 100 according to embodiments. For example, development environment 100 may utilize algorithms and/or databases to provide appropriate code, variables, and/or values for use with respect to a relevant cross platform difference. In operation according to embodiments, when an application aspect is analyzed to be identified as a particular application feature, function, etc. for a determination as to whether cross platform differences are associated therewith, algorithms and/or databases are used to also determine appropriate or desired platform sensitivity characteristics for providing platform sensitivity as described herein.

Additionally or alternatively, development environment 100 may adapt application aspects to utilize platform sensitivity characteristics using data obtained from a developer or other user. For example, development environment 100 may obtain appropriate code, variables, and/or values for use with respect to a relevant cross platform difference from the developer.

It should be appreciated that platform sensitivity characteristics need not be provided specifically for all platforms which may host a particular multi-platform application. For example, platform sensitivity characteristics may be provided with respect to various application aspects for platforms which are most widely in use, which have the most stark cross platform differences associated therewith, which have some unique attribute to be accommodated, etc. Other platforms may be supported by such a multi-platform application without providing platform sensitivity characteristics unique to those platforms, such as through use of application neutral platform sensitivity characteristics, default application platform sensitivity characteristics, etc. For example, default application platform sensitivity characteristics, such as may provide most commonly acceptable characteristics, may be provided to application aspects for use with respect to platforms for which no particular platform sensitivity characteristics are known or specified.

An example of an application aspect for which support for various platform differences may be provided according to embodiments are user interface window controls (e.g., minimize, maximize, and close controls) which traditionally appear on a rendered window frame. When such window controls are rendered using the rendering capabilities of a WINDOWS host platform these window controls would appear in the upper right side of the window frame. However, when such window controls are rendered using the rendering capabilities of a MAC OS host platform these window controls would appear in the upper left side of the window frame. Moreover, the style of these controls (e.g., the stylized representations or icons for minimize, maximize, and close) is appreciably different between WINDOWS and MAC OS platforms.

In this example, block 113 may include code in the multi-platform application to control placement of the foregoing window controls in accordance with a particular host platform upon which the multi-platform application is executed. Specifically, code may be included which, when WINDOWS is detected as the host platform, places the window controls on the upper right side of the window frame and which, when MAC OS is detected as the host platform, places the window controls on the upper left side of the window frame. Additionally or alternatively, block 113 may include a window control placement variable and associated platform specific location values to control placement of the foregoing window controls in accordance with a particular host platform upon which the multi-platform application is executed. Accordingly, when WINDOWS is detected as the host platform, WINDOWS specific window control placement values may be used to place the window controls on the upper right side of the window frame and, when MAC OS is detected as the host platform, MAC OS, MAC OS specific window control placement values may be used to place the window controls on the upper left side of the window frame.

Another example of an application aspect for which support for various platform differences may be provided according to embodiments are user interface environmental attributes (e.g., display gamma, color palate, color temperature, etc.). For example, for images on a WINDOWS host platform the display gamma is approximately 2.2 and the color temperature tends to be cool (i.e., to the blue side of the spectrum). However, for images on a MAC OS host platform the display gamma is approximately 1.3 and the color temperature tends to be warm (i.e., to the red side of the spectrum).

In this example, block 113 may include code in the multi-platform application to adjust the display gamma (e.g., provide gamma correction) and the color temperature in accordance with a particular host platform upon which the multi-platform application is executed. Specifically, code may be included which, when WINDOWS is detected as the host platform, adjusts the display gamma to be approximately 2.2 and the color temperature to be cool for display of the multi-platform application and which, when MAC OS is detected as the host platform, adjusts the display gamma to be approximately 1.3 and the color temperature to be warm for display of the multi-platform application. Additionally or alternatively, block 113 may include environmental attribute variables and associated platform specific location values to control the display gamma and color temperature in accordance with a particular host platform upon which the multi-platform application is executed. Accordingly, when WINDOWS is detected as the host platform, WINDOWS specific environmental attribute values may be used when the multi-platform application is executed and, when MAC OS is detected as the host platform, MAC OS, MAC OS specific environmental attribute values may be used when the multi-platform application is executed.

Environmental attributes adapted for platform sensitivity according to embodiments may be provided as predetermined values or settings. For example, in the foregoing example display gamma and color temperature values may be predetermined with respect to various platforms for inclusion in multi-platform applications at block 113. Additionally or alternatively, environmental attributes adapted for platform sensitivity according to embodiments may be dynamically adjusted. Continuing with the above example, code or algorithms operable in runtime to analyze a host platform environment and determine appropriate display gamma and color temperature values may be provided for inclusion in multi-platform applications at block 113.

It should be appreciated that although the above examples are provided with respect to two host platforms, more than two platforms may be supported according to the concepts herein. For example, in the foregoing examples LINUX may additionally be supported. As with WINDOWS and MAC OS described above, window control placement code and/or platform specific location values and environmental attribute code and/or environmental attribute values may be provided for use when LINUX is detected as the host platform.

Platform sensitivity support of embodiments may be provided with respect to one or more platform without providing code and/or values specific to the particular platform. For example, continuing with the foregoing window controls example, when the foregoing window controls are rendered using the rendering capabilities of a LINUX host platform these window controls would appear in the upper right side of the window frame, similar to a WINDOWS platform. Accordingly, embodiments may operate to share at least a portion of such platform sensitivity characteristics for use with multiple platforms. Alternatively, characteristics may be identified as default characteristics for use with platforms for which no particular characteristics have otherwise been provided (e.g., specified for WINDOWS and MAC OS and defaulted to the WINDOWS specified characteristics or a platform neutral set of characteristics for LINUX, UNIX, etc.).

Through the use of such platform sensitivity characteristics, embodiments facilitate development of a multi-platform application which, when executed, provides a user interface which is consistent with, or otherwise familiar to, a plurality of host platforms. This is true although such host platforms present cross platform differences with respect to various attributes and despite the multi-platform application relying upon its own runtime environment to render such attributes (as opposed to the multi-platform application relying upon the host platform rendering capabilities). Moreover, various attributes of an application aspect may remain platform agnostic (e.g., characteristics unique to the multi-platform application itself may be implemented with respect to an aspect) while platform sensitive characteristics are implemented with respect to the aspect. For example, because embodiments utilize rendering capabilities of the runtime environment, developers are free to implement various style choices, such as to provide a uniform theme throughout the multi-platform application, without having styles or other attributes dictated by a host platform as a result of reliance on the host platform for rendering or other capabilities.

After including support for relevant cross platform differences of the application aspect at block 113, or if was determined that there are no relevant cross platform differences for the application aspect at block 112, processing according to the illustrated embodiment proceeds to block 114.

At block 114 of the illustrated embodiment, a determination is made as to whether development of the multi-platform application is complete. If development is not complete, processing according to the illustrated embodiment returns to block 111 for operation of development environment 100 to develop additional application aspects. However, if development is complete processing according to the illustrated embodiment proceeds to block 115 wherein code comprising the multi-platform application is output as multi-platform application 120, such as to a storage media, to a networked device, to a printer, and/or the like.

Figure 2:
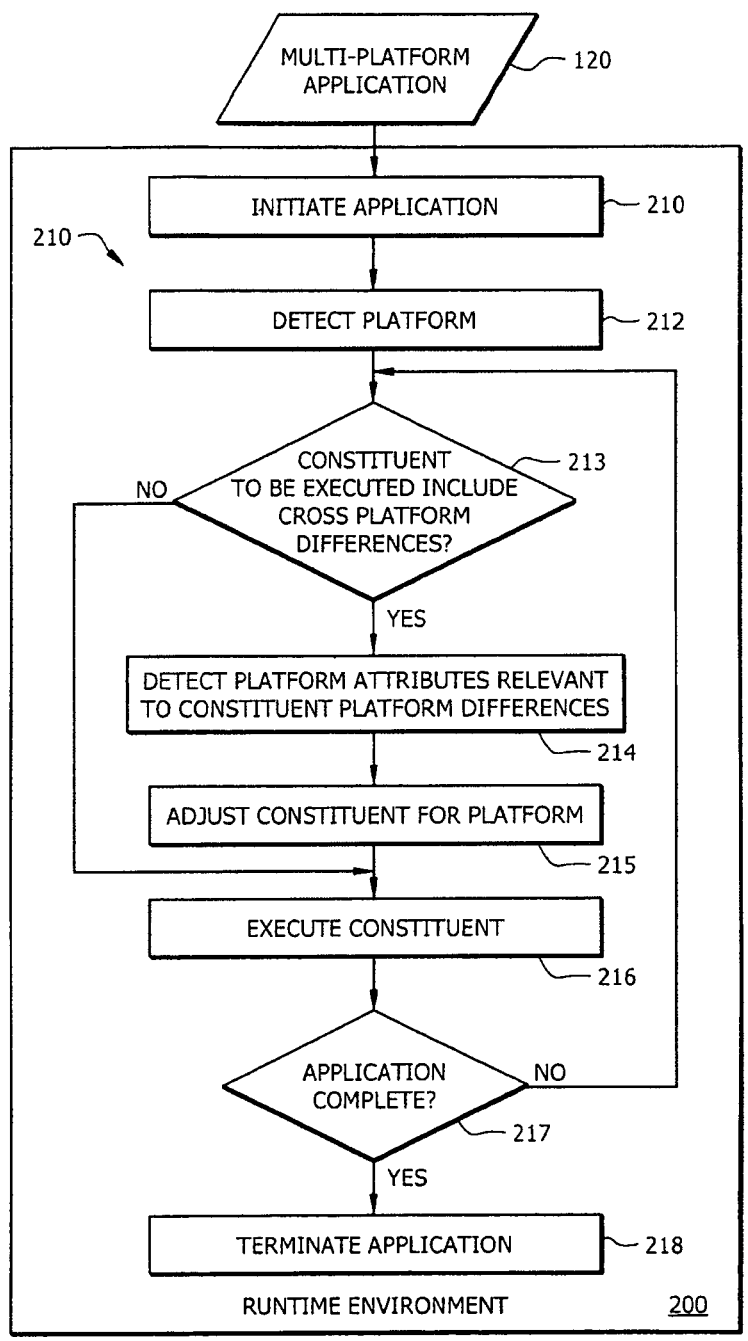
FIG. 2 shows a flow diagram of multi-platform application operation according to an embodiment.

Having described operation according to an embodiment to develop multi-platform applications having one or more aspect which is sensitive to the particular host platform the application is executed upon, attention is directed to FIG. 2 wherein a high level flow diagram of runtime operation of multi-platform applications having one or more aspect which is sensitive to the particular host platform the application is executed upon is shown as process 210 according to an embodiment. The various processes of process 210 may be performed using a runtime environment, shown here as runtime environment 200, adapted to provide functionality as described herein. For example, the AIR™ runtime environment available from Adobe Systems Incorporated may be adapted to implement the concepts herein.

It is presumed in process 210 that a multi-platform application comprising one or more aspects (i.e., various features, functions, etc.) is being executed in runtime environment 200. At block 211 of the illustrated embodiment, multi-platform application 120 is initiated in runtime environment 200.

At block 212 of the illustrated embodiment, the host platform and/or attributes thereof is detected. For example, upon runtime environment 200 recognizing that a multi-platform application has been launched, runtime environment 200 may operate to detect the particular host platform. Additionally or alternatively, the multi-platform application may itself operate to detect the particular host platform according to embodiments. It should be appreciated that detection of the host platform need not be performed in the flow precisely where block 212 is present in the flow. For example, runtime environment 200 may be adapted to detect the particular host platform and/or attributes thereof upon installation, initiation, etc.

A determination is made as to whether the application aspect of multi-platform application 120 to be executed by runtime environment 200 includes cross platform differences at block 213 of the illustrated embodiment. For example, runtime environment 200 may determine whether platform sensitivity characteristics for a plurality of platforms are provided with respect to multi-platform application 120. For example, the application aspect may be adapted to include code unique for each platform having relevant cross platform differences with respect to the application aspect which may be detected by runtime environment 200. Additionally or alternatively, the application aspect may be adapted to include variables and associated platform specific values which may be detected by runtime environment 200. Additionally or alternatively, multi-platform application 120 may be adapted to include information, such as flags, to indicate particular application aspects include cross-platform differences and thus have platform sensitivity characteristics associated therewith.

If it is determined that the application aspect of multi-platform application 120 to be executed by runtime environment 200 does not include cross platform differences at block 213, processing according to the illustrated embodiment proceeds to block 216. However, if it is determined that the application aspect of multi-platform application 120 to be executed by runtime environment 200 includes cross platform differences at block 213, processing according to the illustrated embodiment proceeds to block 214.

At block 214 of the illustrated embodiment platform attributes relevant to the application aspect platform differences are detected. For example, continuing with the foregoing example of providing platform sensitivity with respect to environmental attributes, the host platform environment may be analyzed (e.g., by runtime environment 200 and/or multi-platform application 120) to determine appropriate display gamma and color temperature values. It should be appreciated that detection of platform attributes need not be performed in the flow precisely where block 214 is present in the flow. For example, runtime environment 200 may be adapted to detect various platform attributes upon installation, initiation, etc. In some situations, detection of platform attributes may be omitted, such as where particular platform attribute information is not utilized in providing platform sensitivity with respect to an application aspect. For example, continuing with the foregoing example of providing platform sensitivity with respect to window controls, platform sensitivity characteristics may be implemented for the particular platform without adjustment in accordance with platform attribute information. It should be appreciated, however, that any application aspect may be provided platform sensitivity characteristics which are adjusted for platform attributes, if desired.

At block 215 of the illustrated embodiment, the application aspect is adjusted to provide operation in accordance with the host platform. That is, one or more attribute of the application aspect being executed is adjusted in accordance with the platform sensitivity characteristics to thereby provide platform sensitivity. For example, where the application aspect has been adapted to include code unique for each platform having relevant cross platform differences with respect to the application aspect, the code segments appropriate to the host platform may be executed by runtime environment 200 to thereby render one or more attribute of the application aspect platform sensitive. Additionally or alternatively, where the application aspect has been adapted to include variables and associated platform specific values, the values appropriate to the host platform may be used with respect to their associated variables by runtime environment 200 to thereby render one or more attribute of the application aspect platform sensitive.

Embodiments provide for dynamic adjustment of platform sensitivity characteristics at block 215. For example, environmental attributes adapted for platform sensitivity according to embodiments may be dynamically adjusted. Continuing with the above example, code or algorithms operable in runtime to analyze a host platform environment and determine appropriate display gamma and color temperature values may be executed by runtime environment 200, thereby dynamically adjusting one or more attribute of the application aspect.

At block 216 of the illustrated embodiment, the application aspect is executed by runtime environment 200. Accordingly, the application aspect is executed using one or more platform sensitivity characteristic appropriate to the host platform, thereby providing platform sensitive execution with respect to the application aspect.

A determination is made as to whether execution of multi-platform application 120 is complete at block 217 of the illustrated embodiment. If execution of the application is not complete, processing according to the illustrated embodiment returns to block 213 for a determination as to whether a next aspect to be executed includes cross platform differences. However, if execution of the application is complete, processing according to the illustrated embodiment proceeds to block 218 wherein runtime environment 200 terminates execution of multi-platform application 120.

Figure 3:
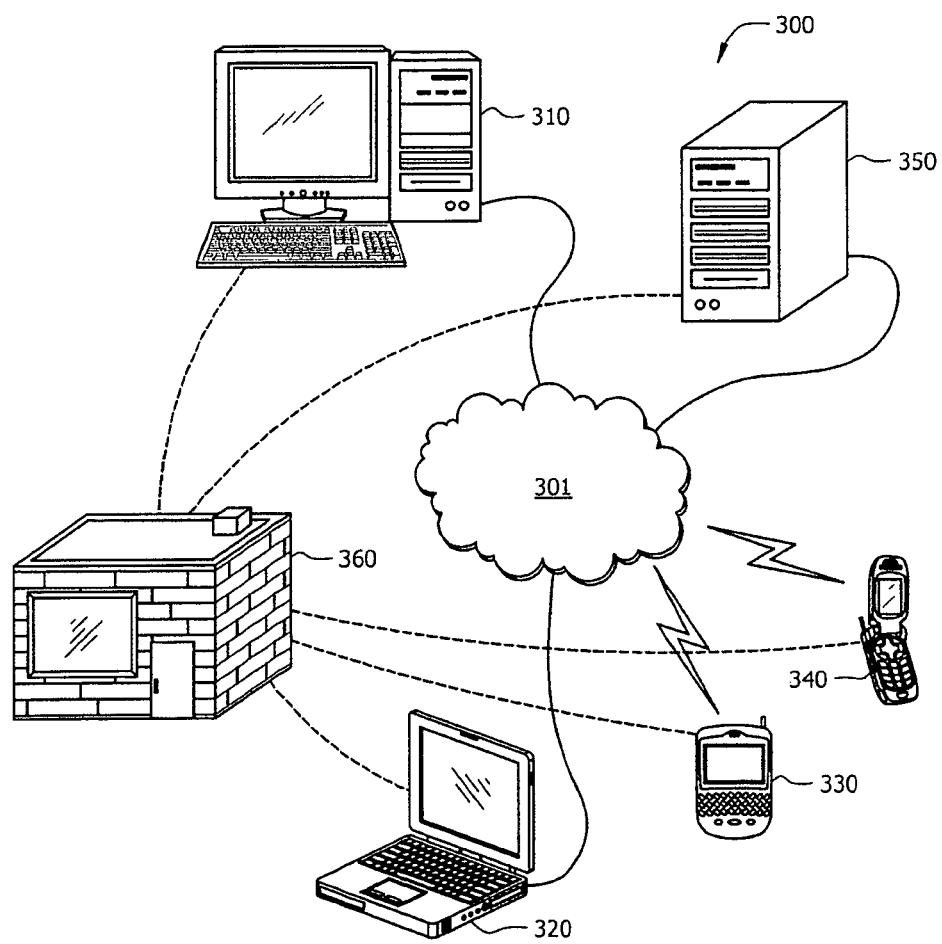
FIG. 3 shows a network system upon which embodiments may be implemented.

Directing attention to FIG. 3, network system 300 upon which embodiments may be implemented is shown. Network system 300 of the illustrated embodiment includes a plurality of processor-based systems, shown as personal computer system 310, portable computer system 320, personal digital assistant (PDA) system 320, personal communication system (PCS) 340, and server system 350, in communication via network 301. Network 301 may comprise a local area network (LAN), a metropolitan area network (MAN), a wide area network (WAN), an intranet, an extranet, the Internet, the public switched telephone network (PSTN), a wireless network, a cable transmission network, and/or the like. Embodiments may be implemented on any one or more of the processor-based systems of FIG. 3, as well as other processor-based systems not specifically illustrated.

It should be appreciated that the various processor-based systems of FIG. 3 may provide a plurality of platforms, one or more of which presents relevant cross platform differences which are accommodated by platform sensitive applications of the present disclosure. For example, personal computer system 310, portable computer system 320, and server system 350 may operate under control of different operating systems, such as WINDOWS, MAC OS, LINUX, SOLARIS, UNIX, etc. Additionally, personal computer system 310 and portable computer system 320 may provide appreciably different processor and/or graphical rendering environments than PDA system 330 and PCS 340.

In operation according to an embodiment, development environment 100 may be executed using personal computer system 310, for example. Multi-platform application 120 developed using development environment 100 may be stored on personal computer system 310, stored to server system 350 for access by various processor-based systems via network 301, provided to any of portable computer 320, PDA system 330, and PCS 340 via network 301, distributed through store 360, etc. Any of personal computer system 310, portable computer system 320, PDA system 330, PCS 340, and server system 350 may comprise an appropriate version of runtime environment 200 and thus provide a host platform for multi-platform application 120 as described herein.

Figure 4:
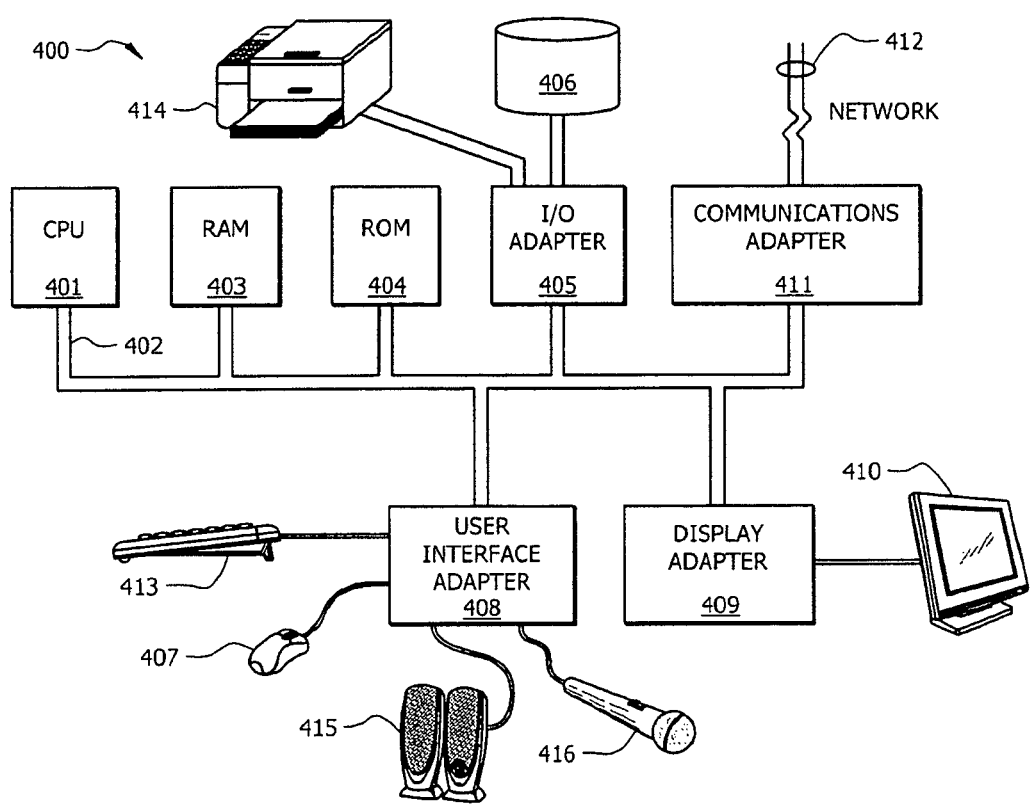
FIG. 4 shows detail with respect to processor-based systems upon which embodiments may be implemented.

FIG. 4 illustrates processor-based system 400, such as may comprise any of the processor-based systems of FIG. 3, adapted for use according to an embodiment. Processor-based system 400 of the illustrated embodiment includes central processing unit (CPU) 401 coupled to system bus 402. CPU 401 may be any general purpose CPU, such as a processor from the PENTIUM family of processors available from Intel Corporation or a processor from the POWERPC family of processors available from the AIM alliance (Apple Inc., International Business Machines Corporation, and Motorola Inc.). However, the present concepts are not restricted by the architecture of CPU 401 as long as CPU 401 supports the inventive operations as described herein.

Bus 402 of the illustrated embodiment is coupled to random access memory (RAM) 403, such as may comprise static random access memory (SRAM), dynamic random access memory (DRAM), synchronous dynamic random access memory (SDRAM), flash memory, and/or the like. Read only memory (ROM) 404, such as may comprise programmable read only memory (PROM), erasable programmable read only memory (EPROM), electrically erasable programmable read only memory (EEPROM), and/or the like, is also coupled to bus 402 of the illustrated embodiment. RAM 403 and ROM 404 hold user and system data and programs as is well known in the art. Bus 402 is also coupled to input/output (I/O) controller 405, communications adapter 411, user interface adapter 408, and display adapter 409.

I/O controller 405 connects to storage device 406, such as may comprise one or more of a hard disk, an optical disk (e.g., compact disk (CD) or digital versatile disk (DVD)), a floppy disk, and a tape, to the processor-based system. I/O controller 405 of the illustrated embodiment is also connected to printer 414, which would allow the system to print information such as documents, photographs, etc. Such a printer may be a traditional printer (e.g. dot matrix, laser, etc.), a fax machine, a copy machine, and/or the like.

Communications adapter 411 is adapted to couple processor-based system 400 to network 412 to provide communications to and/or from external systems, devices, networks, etc. Network 412 of embodiments corresponds to network 301 of FIG. 3.

User interface adapter 408 of the illustrated embodiment couples various user input devices to the processor-based system. For example, keyboard 413, pointing device 407, and microphone 416 may be coupled through user interface adapter to accept various forms of user input. Similarly, speakers 415 may be coupled through user interface adapter to provide user interface output.

The display adapter 409 provides an interface to display 410. Accordingly, CPU 401 may control display of various information, including text, graphics, and images upon display 410 through display adapter 409. Display 410 may comprise a cathode ray tube (CRT) display, a plasma display, a liquid crystal display (LCD), a projector, and/or the like. Although not expressly shown in the illustrated embodiment, display 410 may provide for input of data as well as output of data. For example, display 410 may comprise a touch screen display according to embodiments.

When implemented in software, elements of embodiments are essentially code segments operable upon a processor-based system, such as processor-based system 400, to perform the necessary tasks. The program or code segments can be stored in a computer readable medium, such as RAM 403, ROM 404, and/or storage device 406. Additionally or alternatively, the code segments may be downloaded via computer networks, such as network 412.

Although concepts and their advantages have been described in detail, it should be understood that various changes, substitutions and alterations can be made herein without departing from the spirit and scope of the concepts herein as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present concepts. Accordingly, the appended claims are intended to include within their scope such processes, machines, manufacture, compositions of matter, means, methods, or steps.

What is claimed is:

1. A method comprising:
   detecting a particular platform of multiple platforms prior to execution of an application by a runtime environment;
   initiating execution, by the runtime environment, of the application having a plurality of aspects, wherein said application comprises unique code for each of multiple platforms having relevant cross platform differences with respect to at least one of said plurality of aspects of said application;
   determining information with respect to the particular platform hosting said application, wherein the particular platform is an operating system, wherein the information indicates a selection of the unique code for adjusting an aspect of said plurality of aspects based on detecting the particular platform of the multiple platforms, the selection of the unique code for adjusting said aspect of said plurality of aspects is based at least in part on detecting platform characteristics of the particular platform of the multiple platforms at execution of said aspect within the application;
   determining if said aspect of said plurality of aspects has a relevant cross platform difference associated therewith; and
   dynamically adjusting said aspect at execution of said aspect, using said information with respect to the particular platform, to provide platform sensitive operation appropriate to the particular platform with respect to at least one attribute of said aspect, wherein said adjusting said aspect comprises executing optional application code with respect to said aspect to provide said platform sensitive adjustment of said at least one attribute of said aspect at runtime.

2. The method of claim 1, wherein said application comprises code executable upon a plurality of different platforms.

3. The method of claim 1, wherein said determining information with respect to the particular platform comprises:
   determining the particular platform of a plurality of different platforms said application is adapted for execution upon.

4. The method of claim 1, wherein said determining information with respect to the particular platform said host platform comprises:
   determining a user interface environmental attribute of the particular platform.

5. The method of claim 1, wherein said optional application code comprises an algorithm operable to adaptively adjust said at least one attribute at runtime.

6. The method of claim 1, wherein said adjusting said aspect comprises:
   setting a variable using a value with respect to said aspect associated with the particular platform to provide platform sensitive adjustment of said at least one attribute of said aspect at runtime.

7. The method of claim 1, further comprising:
   providing at least a second attribute of said aspect independent of the particular platform while said at least one attribute is provided adjustment appropriate to the particular platform.

8. The method of claim 7, wherein said second attribute comprises a style of said aspect.

9. The method of claim 8, wherein said at least one attribute comprises a display position associated with said aspect.

10. The method of claim 8, wherein said at least one attribute comprises a user interface environmental attribute associated with said aspect.

11. A system comprising:
    a memory coupled to a processor; and
    a first runtime environment component stored on said memory, wherein when executed by said processor said first runtime environment component generates a first application runtime environment adapted for operation on a first platform which is an operating system, detects the first platform of multiple platforms prior to execution of an application, said first application runtime environment operable to execute the application having at least one aspect to provide platform sensitive operation with respect to a first attribute of said at least one aspect and to provide platform agnostic operation with respect to a second attribute of said at least one aspect, wherein said application comprises unique code selected based on detection of the first platform of the multiple platforms having relevant cross platform differences with respect to at least one of said plurality of aspects of said application said platform sensitive operation dynamically adjusting said first attribute to provide operation in accordance with the first platform, said platform agnostic operation providing said second attribute in accordance with the application, wherein the unique code selected to provide platform sensitive operation with respect to the first attribute of said at least one aspect is based at least in part on detecting platform characteristics of the first platform of the multiple platforms at execution of said at least one aspect within the application, wherein said dynamically adjusting said first attribute comprises executing optional application code with respect to said first attribute to provide platform sensitive operation with respect to the first attribute of said at least one aspect.

12. The system of claim 11, further comprising:
a second runtime environment component, wherein when executed said second runtime environment component generates a second application runtime environment adapted for operation on a second platform, said second application runtime environment operable to execute said application to provide platform sensitive operation with respect to said first attribute of said at least one aspect and to provide platform agnostic operation with respect to a second attribute of said at least one aspect, said platform sensitive operation adjusting said first attribute in accordance with said second platform, said platform agnostic operation providing said second attribute in accordance with said application.

13. The system of claim 11, wherein said platform sensitive operation with respect to a first attribute of said at least one aspect operates to adaptively adjust said at least one attribute at runtime.

14. The system of claim 11, further comprising:
a first application provided comprising code executable upon a plurality of different platforms, said first application having said aspect adapted to provide platform sensitive operation with respect to said plurality of different applications.

15. The system of claim 14, wherein said application comprises code for different platforms of said plurality of platforms, said first application runtime environment operable to execute a portion of said code appropriate to said first platform to provide said platform sensitive operation.

16. The system of claim 14, wherein said application comprises code executable by said first runtime environment for determining a particular platform of a plurality of different platforms said application is executing upon.

17. The system of claim 14, wherein said application comprises code executable by said first runtime environment for determining a user interface environmental attribute of said first platform.

18. The system of claim 14, wherein said application comprises a variable and associated values for different platforms, said first application runtime environment operable to set said variable using a value of said associated values appropriate to said first platform to provide said platform sensitive operation.

19. The system of claim 11, further comprising:
an application development environment operable to develop said application and to adapt said at least one aspect to provide platform sensitive operation with respect to said first attribute of said at least one aspect and to provide said platform agnostic operation with respect to said second attribute of said at least one aspect.

20. A computer program product stored on a non-transitory computer readable medium, said computer program product having computer executable code for providing a runtime environment, said computer program product comprising:
code for detecting a particular platform of multiple platforms prior to execution of an application by a runtime environment;
code for initiating execution, by the runtime environment, of the application having a plurality of aspects, wherein said application comprises unique code for each of multiple platforms having relevant cross platform differences with respect to at least one of said plurality of aspects of said application;
code for determining information with respect to the particular platform hosting said application, wherein the particular platform is an operating system, wherein the information indicates a selection of the unique code for adjusting an aspect of said plurality of aspects based on detecting the particular platform of the multiple platforms, the selection of the unique code for adjusting the aspect of said plurality of aspects is based at least in part on detecting platform characteristics of the particular platform of the multiple platforms at execution of said aspect within the application;
code for determining if said aspect of said plurality of aspects has a relevant cross platform difference associated therewith; and
code for dynamically adjusting said aspect to provide platform sensitive operation appropriate to the particular platform with respect to at least one attribute of said aspect, said adjusting using said information with respect to the particular platform to adjust said aspect appropriate to operate in the particular platform, wherein said adjusting said aspect comprises executing optional application code with respect to said aspect to provide said platform sensitive operation of said at least one attribute of said aspect at runtime.

21. The computer program product of claim 20, wherein said code for determining information with respect to said host platform comprises:
code for determining the particular platform of a plurality of different platforms said application is adapted for execution upon.

22. The computer program product of claim 20, wherein said code for determining information with respect to the particular platform comprises:
code for determining a user interface environmental attribute of the particular platform.

23. The computer program product of claim 20, wherein said optional application code comprises an algorithm operable to adaptively adjust said at least one attribute at runtime.

24. The computer program product of claim 20, wherein said code for adjusting said aspect comprises:
code for setting a variable using a value with respect to said aspect associated with the particular platform to provide platform sensitive adjustment of said at least one attribute of said aspect at runtime.

25. The computer program product of claim 20, further comprising:
   code for providing at least a second attribute of said aspect independent of the particular platform while said at least one attribute is provided adjustment appropriate to the particular platform.

26. The computer program product of claim 25, wherein said second attribute comprises a style of said aspect.

27. The computer program product of claim 26, wherein said at least one attribute comprises a display position associated with said aspect.

28. The computer program product of claim 26, wherein said at least one attribute comprises a user interface environmental attribute associated with said aspect.

29. The method of claim 1, wherein adjusting said aspect comprises adjusting an aspect of a user interface of the operating system.

30. The method of claim 29, wherein the adjusted aspect of the user interface is associated with a placement control of the user interface.

31. The computer program product of claim 20, wherein code for adjusting said aspect comprises code for adjusting an aspect of a user interface of the operating system.

* * * * *